United States Patent [19]

Reinhardt et al.

[11] 4,124,462
[45] Nov. 7, 1978

[54] RECOVERING ZINC FROM A MATERIAL CONTAINING ZINC AND IRON

[75] Inventors: Hans Reinhardt, Västra Frölunda; Harald D. Ottertun, Mölndal; Sven O. S. Andersson, Kållered, all of Sweden

[73] Assignee: MX-Processer Reinhardt & Co. AB, Mölndal, Sweden

[21] Appl. No.: 762,561

[22] Filed: Jan. 26, 1977

[30] Foreign Application Priority Data

Jan. 26, 1976 [SE] Sweden .................... 7600791
Sep. 26, 1976 [SE] Sweden .................... 7610685

[51] Int. Cl.$^2$ .................... C01G 3/10; C01G 9/06; C25C 1/12; C25C 1/16
[52] U.S. Cl. .................... 204/119; 204/108; 423/24; 423/100; 423/101; 423/104; 423/109
[58] Field of Search .................... 423/100, 101, 104, 109, 423/24, 27, 41, DIG. 4; 75/109, 117, 120, 101 BE; 204/108, 115, 114, 119

[56] References Cited

U.S. PATENT DOCUMENTS

| | | | |
|---|---|---|---|
| 936,762 | 10/1909 | Crispo | 423/41 |
| 1,922,390 | 8/1933 | O'Brien et al. | 423/109 |
| 2,405,302 | 8/1946 | Griffith et al. | 423/101 |
| 3,869,360 | 3/1975 | Kane et al. | 423/DIG. 4 |
| 3,966,569 | 1/1976 | Reinhardt et al. | 75/101 BE |
| 4,029,733 | 6/1977 | Faugeras et al. | 423/100 |

OTHER PUBLICATIONS

Reinhardt, H. "Solvent Extraction for Recovery of Metal Waste" *Chemistry and Industry*, Mar. 1, 1975, pp. 210-213.
Schumb et al., *Hydrogen Peroxide*, Reinhold Pub. Corp, NY 1955 [QD181.H1S28] pp. 592-594.
Habashi, *Principles of Extractive Metallurgy*, vol. II, Gordon & Breach, N.Y. 1970, pp. 10, 206, 207, 332, 333.
Habashi, *Principles of Extractive Metallurgy*, vol. II, Gordon and Breach, N.Y., 1970, pp. 175, 176, 227, 228, 237, 238, 339.

*Primary Examiner*—Brian Hearn
*Attorney, Agent, or Firm*—Burns, Doane, Swecker & Mathis

[57] ABSTRACT

Zinc is recovered from a material containing zinc and iron. The material is leached with sulphuric acid to produce a final pH of 3-5.5. Zinc powder is added to the leaching solution to precipitate polluting metals. Zinc is now extracted with a solution of a dialkyl phosphoric acid in an organic solvent. Zinc is extracted from the organic solution with sulphuric acid. Zinc is recovered from the sulphuric acid solution as metal or as zinc sulphate.

7 Claims, 3 Drawing Figures

RECOVERING ZINC FROM A MATERIAL CONTAINING ZINC AND IRON

The invention relates to a method of recovering zinc from a material containing zinc and iron. An object of the invention is to effect a method which can be used on a material having such a low zinc content that a leaching process cannot produce a solution having a sufficiently high content of zinc to enable zinc recovery by means of electrolysis or crystallization. Another object is to effect a method which can be used on the dust caught in flue-gas filters from steel mills. Such dust contains zinc and iron, and usually also manganese and lead and small quantities of, for instance, copper, cadmium, nickel and cobalt. Another object is to effect a sulphuric acid leaching process which consumes a minimum of sulphuric acid.

The method according to the invention comprises leaching the material with an aqueous solution of sulphuric acid, adding sulphuric acid in a quantity to produce a pH of from about 3 to about 5.5 in the final stage of the leaching process, adding zinc powder to the leaching solution thus obtained, in order to reduce the content of metallic impurities in the leaching solution, extracting zinc from the aqueous solution thus obtained by contacting it, in a liquid-liquid extraction process, with a solution of a dialkyl phosphoric acid in an organic solvent, returning the aqueous raffinate leaving the extraction process to renewed leaching, re-extracting zinc from the organic solution by contacting it, in a liquid-liquid extraction process, with an aqueous solution containing from about 40–600 grams per liter of sulphuric acid in such quantity that the sulphuric acid solution leaving the re-extraction process contains from about 60 to about 150 grams per liter of zinc, returning the organic solution leaving the re-extraction process to renewed extraction, and recovering zinc from the zinc-containing sulphuric acid solution.

This final recovery of zinc from the zinc-containing sulphuric acid solution can be made by means of an electrolysis process, to form zinc metal, or by means of a crystallization process, to form zinc sulphate.

The zinc-containing material shall be leached with sulphuric acid in such a way that the final pH is from about 3 to about 5.5. When leaching certain materials the entire leaching process can be performed within this pH range. However, in order to achieve more efficient and rapid leaching it is preferred to use a lower pH during the major part of the leaching process, preferably from about 0 to about 3. The pH may be kept constant during the leaching process by using a dosing means for the sulphuric acid and a pH measuring means which activates the dosing means. Alternatively, the entire estimated quantity of sulphuric acid may be added at the start of the leaching process. When leaching is substantially complete, the pH is then adjusted to the desired final value of from about 3 to about 5.5. This may be done by adding calcium carbonate or sodium hydroxide, for instance. However, in order to keep down the consumption of sulphuric acid it is preferred to adjust the pH by adding more leaching material, only in the final stage of the pH adjustment adding an alkaline material, if necessary. Which ever method is chosen, the final result is that zinc is present in the leaching solution in the form of zinc sulphate, while iron exists in the form of undissolved hydroxide. The final pH, from about 3 to about 5.5, is suitably maintained for some hours in order to give all the iron time to be precipitated in the form of hydroxide. The temperature during the leaching may be from about 20° C up to the boiling point of the leaching solution. However, a range of from about 50° to about 95° C is the preferred temperature.

The iron in the leaching solution should be present in trivalent form, as a maximum of iron in the form of undissolved hydroxide will not otherwise be obtained. If the leaching solution contains divalent iron, said iron should be oxidized to trivalent iron, for instance by blowing in air or oxygen gas into the leaching solution, either during the leaching process or in a special operation after the leaching process. Dust from a steel mill is preferably leached in a leaching vessel in two steps, without separation of the leaching residue between the steps. The leaching solution consists of raffinate solution from the extraction process. The first leaching step takes place at a pH of from about 0 to about 3, and the pH is adjusted by adding sulphuric acid as necessary. Most of the sulphuric acid required for the first leaching step is present in the added raffinate solution. The extra sulphuric acid required in the leaching process is preferably taken from the electrolysis process through a bleed. Leaching is performed at a temperature of from about 50° to about 95° C for from about 1 to about 24 hours. The pH is then adjusted so that the final pH in the solution is from about 3 to about 5.5. This pH adjustment is preferably carried out at a temperature of from about 60° to about 95° C. The pH thus obtained is maintained for from about 1 to about 24 hours to permit complete precipitation of the iron. The pH adjustment may be performed in the first leaching step by the addition of more steel mill filter dust, for example, or in the final leaching step by the addition of a neutralizing agent, such as calcium carbonate or sodium hydroxide. The remaining solid leaching residue is then separated by means of filtering or the like, and the solution continues to one or more purification processes.

The leaching solution is now purified by means of cementation by the addition of zinc powder. Ion exchange then occurs so that zinc is dissolved whereas certain other metals, such as copper, cadmium, nickel and cobalt, precipitate in metallic form. The addition of from about 0.5 to about 5 grams of zinc per liter of leaching solution has been found suitable. The cementation preferably takes place at a temperature of from about 60° to about 95° C and a pH of from about 4 to about 6. After the purification process the remaining solid material is removed by filtration or the like, and the purified solution is conveyed to a storage vessel.

When leaching filter deposits from steel mills the following is typical of the composition of the purified leaching solution: zinc 20–80 grams per liter, iron <10 ppm, copper, cadmium, nickel and cobalt <1 ppm. There are only traces of other impurities. A certain amount of chloride and fluoride can be tolerated in the solution since the following extraction stage prevents the transfer of these ions to the final solution.

Zinc is now extracted from the purified leaching solution by treating the solution with a solution of a dialkyl phosphoric acid in an organic solvent. It is preferred to use a compound as defined by one of the following formulae:

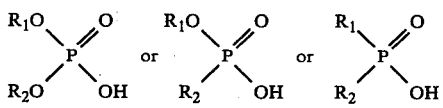

The organic radicals $R_1$ and $R_2$, which may be similar or dissimilar, consist of a straight or branched hydrocarbon, suitably containing at least five carbon atoms so as to give the dialkyl phosphoric acid a very low solubility in water. It is preferred to use di(-2-ethylhexyl)-phosphoric acid.

The organic solvent serves as a diluent for the dialkyl phosphoric acid. Such solvents or diluents are well known to the skilled worker. They shall be substantially water-immiscible, and may consist of, for example, petroleum products such as aromatic or aliphatic hydrocarbons, or chlorinated solvents such as carbon tetrachloride. We prefer a hydrocarbon mixture of the type usually referred to as kerosene. The boiling point of the kerosene is preferably from about 160° to about 260° C, the flash-point is preferably higher than about 60° C, and the density is preferably from about 0.75 to about 0.85 grams per milliliter. Examples of useful kerosene-type solvents are those sold under the names of Escaid, Nysolvin, and Shellsol. The quantity of dialkyl phosphoric acid is preferably from about 10 to about 90% of the total weight of the organic solution. The temperature during the extraction process is preferably from about 20° to about 60° C.

The extraction process is preferably performed in 1 to 3 steps. In order to achieve a high rate of productivity and a closed leaching cycle it is preferred to perform the extraction directly on the leaching solution. Only from about 20 to about 80% of the zinc content is therefore transferred to the organic solution. When leaching filter deposits from steel mills, this means that the zinc content in the raffinate solution is from about 10 to about 60 grams per liter. The raffinate is returned for renewed leaching. The low extraction yield is not a disadvantage since the remaining quantity of zinc in the raffinate is recovered in the leaching process. The pH value of the leaching solution during extraction is preferably the same as the final pH after the purification process, but may be from about 1 to about 5.5. However, a ph of from about 3 to about 5.5 is preferred. If necessary the organic solution may be transferred to a washing process consisting of one or more steps in which the organic solution is brought into contact with water or diluted sulphuric acid. The sulphuric acid content shall not be so high, however, as to result in any zinc being washed out from the organic solution. The function of the washing process is to efficiently separate any drops of water phase which may have accompanied the solution and which might contaminate the final solution with chloride and undesired metals, for instance.

Zinc is now re-extracted from the organic solution by treating said solution with a water solution of sulphuric acid containing from about 40 to 600 grams per liter of free sulphuric acid. Zinc thus passes from the organic solution to the sulphuric acid solution. The phase ratio is selected so that the sulphuric acid solution will contain at least 50 grams per liter of zinc. However, it is preferred to use a zinc-containing sulphuric acid solution which is caused to circulate between a plant for re-extraction and a plant for the recovery of zinc by means of crystallization or electrolysis. The zinc-containing sulphuric acid solution used for the re-extraction contains, for instance, 50 grams per liter of zinc, and the phase ratio should preferably be chosen so that the solution takes up at least another 50 grams per liter of zinc. The solution passing to the zinc-recovery process will therefore contain at least about 100 grams per liter of zinc, which is a preferred lowest concentration for both crystallization and electrolysis. The organic solution from the re-extraction process is returned for renewed extraction.

The final recovery of zinc is performed in known manner by electrolysis of the zinc-containing sulphuric acid solution, or by cooling the solution with subsequent crystallization of zinc sulphate. In the case of electrolysis the sulphuric acid formed on the anode can be returned to the leaching process.

If the material to be leached contains considerable quantities of copper, more than 1 per cent by weight, for instance, the copper may be considered not as an impurity but as a metal which it may be profitable to recover. The invention also provides a method for such recovery of copper. This method comprises leaching the material at a pH of at most 3, extracting copper from the leaching solution by means of a liquid-liquid extraction process, increasing the pH of the leaching solution to from about 3 to about 5.5 by the addition of alkaline material or more material to be leached, adding zinc powder to the leaching solution, and continuing the process described hereinabove.

The zinc-iron-copper-bearing starting material is leached in the manner described above. Leaching is continued until zinc and copper have been removed from the material to the desired degree. The addition of sulphuric acid is adjusted so that, at least in the final stage, the pH is between about 0 and about 3. After filtering the leaching solution is subjected to a liquid-liquid extraction process with an organic solvent containing a copper extractant. Such a liquid-liquid extraction process is known and does not constitute an object of the present invention. It will merely be pointed out here that a mixture of beta-hydroxy benzophenone and an alpha-hydroxy oxime is preferred as the extractant. Such a mixture is commercially available under the trade mark LIX-64N. Kerosene is preferred as solvent. During the extraction the organic solution takes up copper from the leaching solution. Copper is re-extracted from the organic solution by treating it with a water solution of sulphuric acid, preferably containing from about 100 to about 250 grams per liter of sulphuric acid. The ratio between the two solutions is suitably such that the sulphuric acid solution will contain from about 10 to about 30 grams per liter of copper. The organic solution is used for renewed extraction of copper. Copper is recovered from the copper-containing sulphuric acid solution in known manner through electrolysis or crystallization, for instance.

The raffinate from the copper extraction should preferably contain less than about 0.5 grams per liter of copper. This raffinate is now treated as described earlier in this specification. This means that the pH shall be raised to from about 3 to about 5.5. This can be done by using the raffinate as leaching liquid for leaching a material containing zinc and iron but little copper. If no such material is available, the pH can be increased by the addition of an alkaline material such as calcium carbonate or sodium hydroxide. Of course a combined process can be used for the pH adjustment, i.e. first a leaching process with a material containing little copper, and then the addition of alkaline material. When the pH has thus been adjusted to from about 3 to about 5.5, the leaching solution is further treated as described above, i.e. by the addition of zinc powder and so on.

When leaching zinc-iron-copper-containing material, such as dust collected from the flue gases from the manufacture of brass, the process of leaching copper out of the material may take considerably longer than normal. The reason for this slow leaching process appears to be that copper, and possibly also other metals, are only partially oxidized and are therefore partially present in metallic form. The rate and yield of the leaching process will increase if the leaching solution is given a redox potential of at least 500 mV, measured in relation to a hydrogen gas electrode. Even maintaining this redox potential only during the initial stage of the leaching process, for example for 1 hour, gives a considerable increase in the leaching yield. However, it is preferred to maintain said redox potential throughout the leaching process.

The desired redox potential is obtained by adding an oxidant to the leaching solution, such as air, $H_2O_2$, $Na_2O_2$, $MnO_2$. The addition of $MnO_2$, such as pyrolusite, is preferred. When leaching dust from flue gas from the manufacture of brass a suitable weight ratio of $MnO_2$ to dust is from about 0.5:1 to about 1.5:1.

BRIEF DESCRIPTION OF THE DRAWINGS

The invention will be described with reference to the drawings.

Figure 1:
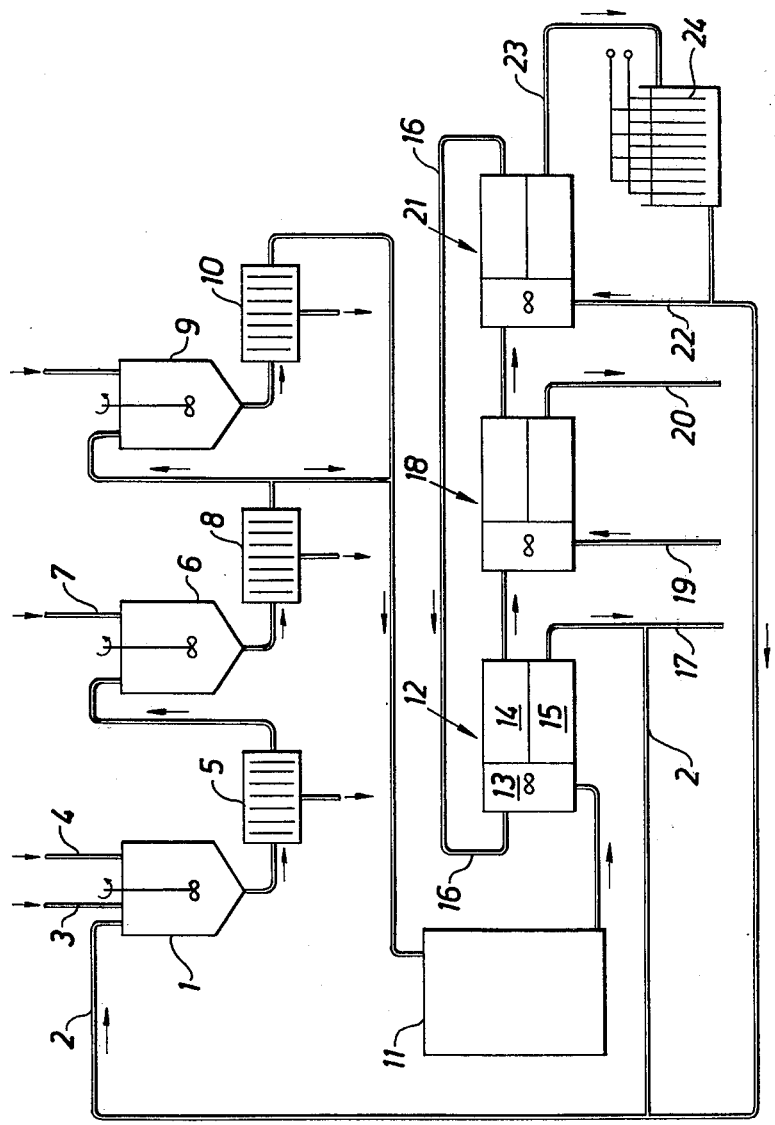
FIG. 1 illustrates a plant for the recovery of zinc from a zinc-bearing material.

In the plant of FIG. 1 diluted sulphuric acid is supplied to a leaching vessel 1 provided with stirrer, through a pipe 2. The solid material to be leached is supplied through a pipe 3 and concentrated sulphuric acid through a pipe 4. The leaching solution is filtered through a filter 5 and conveyed to a tank 6 with stirrer, to which zinc powder is supplied through a pipe 7. Metals precipitated through cementation, and any remaining zinc powder, are separated in a filter 8. The purified solution may, if desired, be conducted through an additional purifying plant, comprising a vessel 9 with stirrer and a filter 10. Generally, however, the solution can be conveyed straight to a storage tank 11. From here, the solution is conveyed to a mixing chamber 13 in a liquid-liquid extraction apparatus 12 of mixer-settler type. An organic solution of a dialkyl phosphoric acid is also supplied to the mixing chamber 13 through a pipe 16. After mixing, the raffinate, i.e. the aqueous phase, is collected in a chamber 15 and the main quantity is led back to the leaching container 1 through the pipe 2. A small quantity is, however, removed from the plant through a pipe 17 to prevent a concentration of impurities in the leaching solution. The lighter organic phase is collected in a chamber 14 and taken to a washing apparatus 18 of mixer-settler type. Here the organic phase is washed with water, or with an extremely weak solution of sulphuric acid, which is supplied through a pipe 19 and removed through a pipe 20. The washed organic phase is then conveyed to a re-extraction apparatus 21 where it is treated with sulphuric acid of such strength that the zinc is transferred to the sulphuric acid solution.

The organic phase, depleted of zinc, is returned through the pipe 16 to the extraction apparatus 12, and the zinc-containing sulphuric acid solution is conducted through a pipe 23 to an electrolysis apparatus 24 where metallic zinc is recovered. The electrolyte, depleted of zinc, is conducted through a pipe 22 to renewed re-extraction. A small quantity of the electrolyte may be led through a pipe 25 to renewed leaching in the vessel 1.

Figure 2:
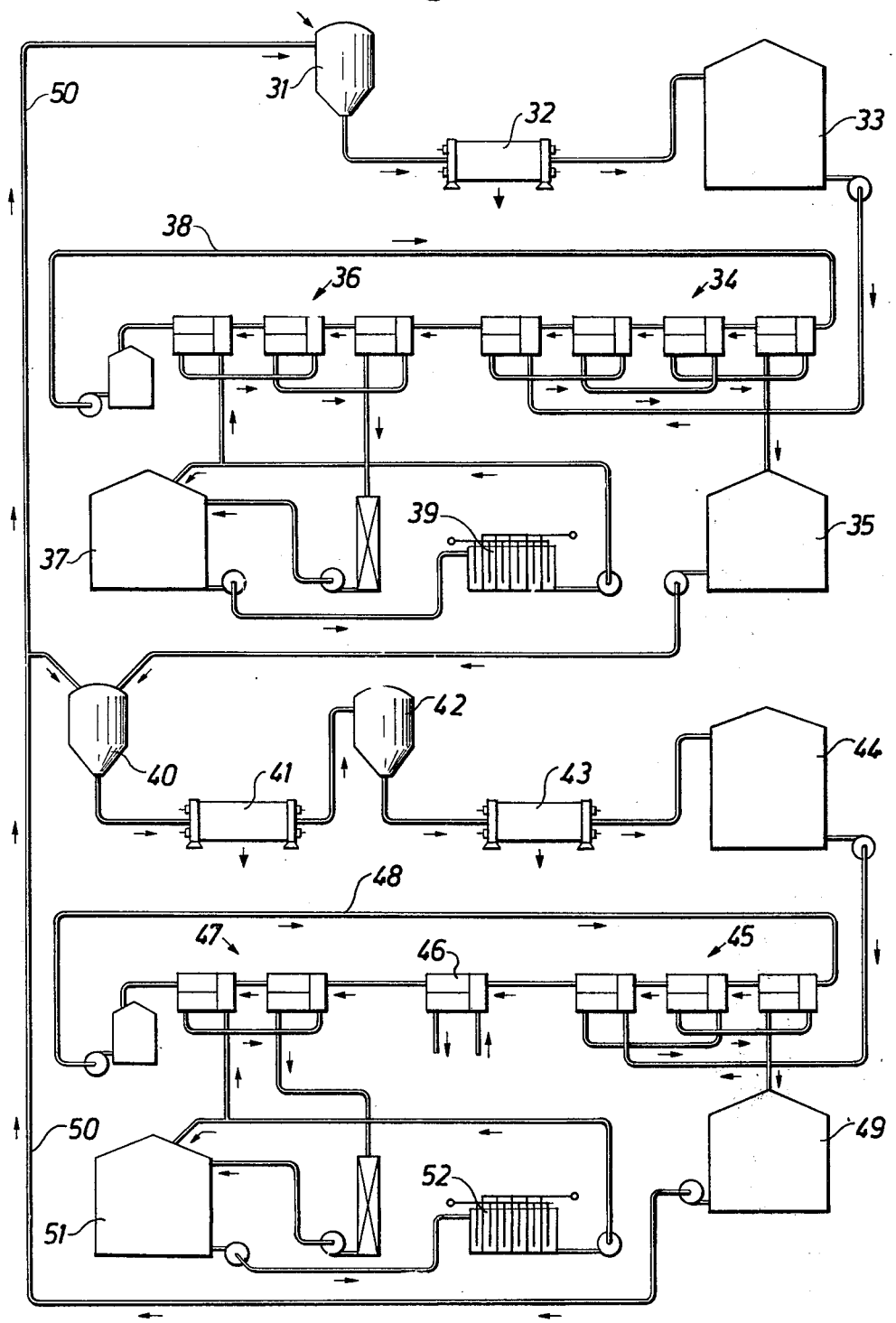
FIG. 2 shows a plant for recovering zinc and copper from flue-gas dust.

In the plant according to FIG. 2 sulphuric acid and flue-gas dust are supplied to a leaching vessel 31. The leaching solution is filtered in a filter 32, stored in a tank 33 and conveyed to a liquid-liquid extraction apparatus 34, comprising four mixer-settler units. Here the leaching solution is extracted in counter-current flow with a copper reactant in an organic solvent. The raffinate is conveyed to a vessel 35 and the organic solution is led to an extraction apparatus 36 comprising three extraction units where copper is re-extracted by means of a sulphuric acid solution in counter-current flow. The organic solution is returned through a pipe 38 for renewed extraction. The sulphuric acid solution is conveyed via a storage tank 37 to an electrolyser 39 where metallic copper is recovered.

From the storage tank 35 the raffinate, now almost free of copper, is conducted to a mixing tank 40 where the pH is adjusted to from about 3 to about 5.5. This is done either by adding an alkaline material, or by contacting the raffinate with a copper-free material in another leaching operation. After filtering in a filter 41, zinc powder is added to the solution in a mixing tank 42. Metal particles precipitated by means of cementation and any remaining zinc particles are separated in a filter 43. The liquid is led by way of a storage tank 44 to a series 45 of three mixer-settler units where the liquid is extracted in counter-current flow with an organic solution containing a zinc reactant in the form of a dialkyl phosphoric acid. The raffinate is returned via a storage tank 49 and pipe 50, some to the leaching or neutralizing tank 40 and some to the leaching tank 31. The zinc-bearing organic solution is washed in a mixer-settler 46, after which zinc is re-extracted with a sulphuric acid solution in a set 47 of two mixer-settler units. The organic solution returns through a pipe 48 to the extraction units 45. The zinc-containing sulphuric acid solution is conducted via a storage tank 51 to an electrolyser 52 where zinc is obtained in metallic form.

Figure 3:
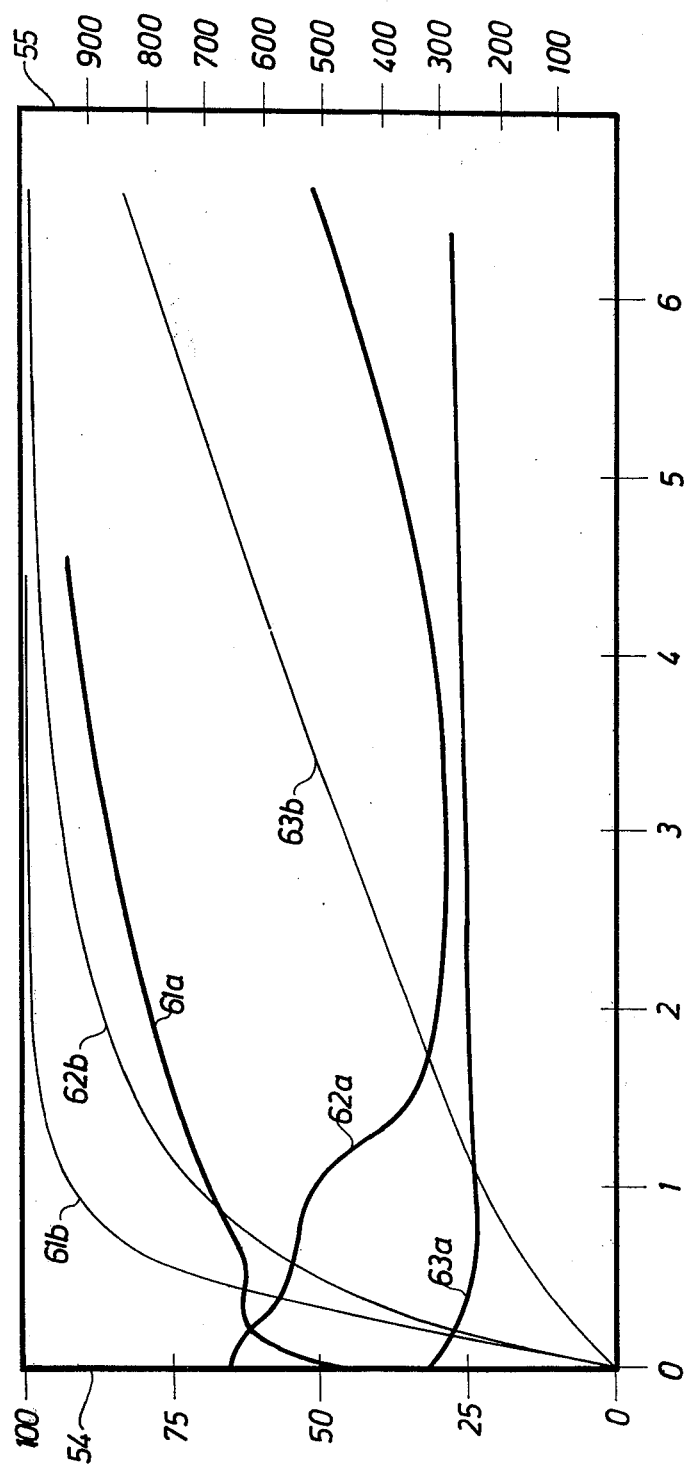
FIG. 3 illustrates the result of an increase in the redox potential when leaching zinc-copper-bearing material.

FIG. 3 illustrates the significance of the redox potential when leaching copper-containing material. The abscissa in the diagram of FIG. 3 represents the leaching time in hours. The left ordinate 54 represents the percentage of copper leached out from the material. The right ordinate 55 represents the redox potential in millivolts. Homogenized dust from the dust separators in a plant for manufacturing brass contained 36% Zn, 32% Cu and 2% Fe. 20 kilograms of this dust were mixed with 1 cubic meter of water at 60° C in a leaching tank. Sulphuric acid having a concentration of 3M was added at such a rate that the pH of the leaching solution was held constant at 1.7. The redox potential and the content of dissolved copper were measured and plotted in the diagram in FIG. 3 as a function of the time, see the graphs 63a and 63b. The graph 63a represents the redox potential and the graph 63b represents the dissolved copper.

The same leaching process was repeated with the addition of 10 kilograms $MnO_2$, see the graphs 62a and 62b, and with the addition of 33 kilograms $MnO_2$, see the graphs 61a and 61b. The graph 62b discloses that the addition of 10 kilograms MnO₂ resulted in a marked increase in the leaching rate. The graph 61b discloses that the addition of 33 kilograms MnO₂ resulted in a still more pronounced increase in the leaching rate. In the experiments with an addition of MnO₂ the content of dissolved manganese was also measured in the leaching solution during the leaching process. After a couple of hours the manganese content stabilized at about 5 grams per liter in experiment 62, and at about 6 grams per liter in experiment 63.

EXAMPLE 1

In a plant of the type shown in FIG. 1 zinc was recovered from dust from the flue-gas filters of a steel mill. The dust contained 31% zinc, 20% iron, 0.2% copper, 0.1% cadmium, 2% manganese, and 6% lead, based on the weight of the dry dust.

520 liters raffinate solution from an extraction process containing 26 grams per liter of zinc and 0.27 M $H_2SO_4$ were added into a leaching tank. 66 kilograms of said dust and 15 liters concentrated $H_2SO_4$ were then added. The leaching temperature was 60° C and leaching continued for 20 hours. After the leaching process, the solution contained the metal contents listed in column 1 of the following Table. The pH was about 2.

Neutralization was accomplished by the addition of more dust, whereupon a final pH of 5.2 was obtained. The solids were then filtered off and the clear solution was transferred to another leaching vessel for further purification. 510 grams zinc powder were added and the mixture was stirred for about 1 hour. The excess zinc powder was then filtered off. Analysis of the filtered solution indicated the metal contents listed in column 2 of the following table.

|    | 1 before purification | 2 after purification |
|----|----|----|
| Zn | 60 | 59 |
| Fe | 0.7 | < 0.001 |
| Cu | 0.2 | < 0.001 |
| Cd | 0.1 | < 0.001 |
| Mn | 2.6 | 2.6 |

The leaching solution was extracted in counter-current flow in a mixer-settler apparatus comprising three units with an organic solution consisting of 50% by volume di(-2-ethyl-hexyl) phosphoric acid and 50% by volume kerosene. The ratio of organic phase to water phase was about 3:1. The organic solution contained after the extraction about 50% of the entering zinc content. The water solution, the raffinate, leaving the extraction contained 27 grams per liter of zinc. This solution was conveyed to a storage tank for use in renewed leaching.

The organic solution from the zinc extraction was treated in a mixer-settler apparatus comprising two units in counter-current flow with a solution from the electrolysis of zinc, containing 0.6 M free sulphuric acid and about 100 grams per liter of zinc. The zinc was thus re-extracted from the organic solution to the sulphuric acid solution. The phase ratio was about 3:1. The sulphuric acid solution leaving the re-extraction process contained 128 grams per liter of zinc. By electrolysis of this solution metallic zinc was obtained, and the content of zinc in the solution was reduced to 100 grams per liter. The organic solution from which zinc had been removed was returned for renewed extraction.

EXAMPLE 2

In the plant shown in FIG. 2 zinc and copper were recovered from flue-gas dust from a brass manufacturing plant. The dust contained 36% zinc, 1% iron, 14% copper, 2% manganese and 3% lead, based on the weight of dry dust.

600 liters raffinate solution from the zinc extraction apparatus 45 containing 10.6 grams per liter of zinc, 1.8 grams per liter of manganese and 0.18 M $H_2SO_4$ were filled into the leaching tank 31. The leaching temperature was 60° C and leaching continued for 16 hours. After the leaching process the solution contained 22.6 grams per liter of zinc, 4.2 grams per liter of copper, 0.3 grams per liter of iron and 2.2 grams per liter of manganese. The pH was 2. The solid residue was filtered off and the leaching solution was extracted in the counter-current flow mixer-settler units 34 with an organic solution consisting of 10 per cent by volume LIX-64N (manufacture General Mills Inc., USA) and 90 per cent by volume kerosene. The ratio of organic phase to water phase was 2:1. The organic solution leaving the extraction process contained about 96% of the copper quantity. The water solution leaving the extraction, the raffinate, contained therefore 22 grams per liter of zinc, 0.2 grams per liter of copper, 0.3 grams per liter of iron and 2 grams per liter of manganese and had a pH of about 1.5. This raffinate was passed to the vessel 35.

The organic solution from the copper extraction apparatus 34 was contacted in counter-current flow in the mixer-settler apparatus 36 with solution from the electrolysis 39 of copper, containing 2.3 M free sulphuric acid and about 26 g/l copper. The copper in the organic solution was thus re-extracted to the sulphuric acid solution. The phase ratio was about 6:1. The sulphuric acid leaving the re-extraction process contained 38 g/l copper. By electrolysis of this solution metallic copper was obtained, and the content of copper in the solution was reduced to 26 grams per liter. The organic solution thus depleted of copper was returned for renewed extraction.

Neutralisation of the raffinate from the copper extraction was achieved by the addition of more dust into the tank 40, resulting in a final pH of 4.8. The solid residue was then filtered off and the clear solution was transferred to the leaching tank 42 for purification. 510 grams zinc powder were added and the mixture was stirred for about 1 hour. The excess zinc powder was then filtered off. The filtered solution contained 23 grams per liter of zinc, 2 grams per liter of manganese, less than 0.005 grams per liter of Fe and less than 0.001 grams per liter of copper.

The purified solution was extracted in counter-current flow in the mixer-settler units 45 with an organic solution consisting of 50 per cent by volume di(-2-ethyl hexyl)phosphoric acid and 50 per cent by volume kerosene. The ratio organic phase to water phase was about 3:1. The organic solution contained about 60% of the zinc after the extraction. The water solution leaving the extraction, the raffinate, contained 9 grams per liter of zinc. This solution was transferred to the storage tank 49 for use in renewed leaching.

The organic solution from the zinc extraction process was treated in counter-current flow in the mixer-settler units 47 with solution from the electrolysis of zinc, containing 1.2 M free sulphuric acid and about 80 grams per liter of zinc. The zinc was thus re-extracted from the organic solution to the sulphuric acid solution. The phase ratio was about 6:1. The sulphuric acid solution leaving the re-extraction process contained 106 grams per liter of zinc. Metallic zinc was obtained from this solution by means of electrolysis, resulting in the zinc content of the solution being reduced to about 80 grams per liter. The organic solution depleted of zinc was returned to renewed extraction.

What is claimed is:

1. The method of recovering zinc from a material containing zinc and iron, comprising (a) leaching the material with an aqueous solution of sulfuric acid, the sulfuric acid being added in a quantity to produce a pH of from about 3 to about 5.5 in the final stage of the leaching process, so as to dissolve the zinc but not the iron contained in the material, (b) adding zinc powder to the leaching solution thus obtained, in order to reduce the content of metallic impurities in the leaching solution, (c) extracting zinc from the aqueous solution thus obtained by contacting it, in a liquid-liquid extraction process, with a solution of a dialkyl phosphoric acid in an organic solvent, (d) returning the aqueous raffinate leaving the extraction process to renewed leaching, (e) re-extracting zinc from the organic solution by contacting it, in a liquid-liquid extraction process, with an aqueous solution containing from about 40 to about 600 grams per liter of sulfuric acid in such quantity that the sulfuric acid solution leaving the re-extraction process contains from about 60 to about 150 grams per liter of zinc, (f) returning the organic solution leaving the re-extraction process to renewed extraction, and (g) recovering zinc from the zinc-containing sulfuric acid solution.

2. The method of claim 1, comprising electrolyzing the zinc-containing sulphuric acid solution to produce metallic zinc.

3. The method of claim 1, comprising crystallizing the zinc-containing sulphuric acid solution to produce zinc sulphate.

4. The method of claim 1, wherein an oxidant selected from the group consisting of oxygen, air, $H_2O_2$, $Na_2O_2$ and $MnO_2$ is added to the leaching solution.

5. A method of recovering zinc and copper from a material containing zinc, copper and iron, comprising (a) leaching the material at a pH of at most 3, (b) recovering copper from the leaching solution by means of a liquid-liquid extraction process, (c) increasing the pH of the leaching solution to from about 3 to about 5.5 by the addition of alkaline material or by the addition of more material to be leached, (d) adding zinc powder to the leaching solution thus obtained, in order to reduce the content of metallic impurities in the leaching solution, (e) extracting zinc from the aqueous solution thus obtained by contacting it, in a liquid-liquid extraction process, with a solution of a dialkyl phosphoric acid in an organic solvent, (f) returning the aqueous raffinate leaving the extraction process to renewed leaching, (g) re-extracting zinc from the organic solution by contacting it, in a liquid-liquid extraction process, with an aqueous solution containing from about 40 to about 600 grams per liter of sulphuric acid in such quantity that the sulphuric acid solution leaving the re-extraction process contains from about 60 to about 150 grams per liter of zinc, (h) returning the organic solution leaving the re-extraction process to renewed extraction, and (i) recovering zinc from the zinc-containing sulphuric acid solution.

6. A method of recovering zinc and copper from a material containing zinc, copper, and iron, comprising (a) leaching the material with an aqueous solution of sulphuric acid at a pH of at most 3, (b) extracting copper from the aqueous leaching solution, in a liquid-liquid extraction process, with a solution of a copper extractant in an organic solution, (c) re-extracting copper from the organic solution by contacting the organic solution, in a liquid-liquid extraction process with an aqueous solution containing from about 100 to about 30 grams per liter of sulphuric acid in such quantity that the sulphuric acid solution leaving the re-extraction process contains from about 10 to about 30 grams per liter of copper, returning the organic solution leaving the re-extraction process to renewed extraction of copper, (e) recovering copper from the copper-containing sulphuric acid solution, (f) adding more material to be leached, or an alkaline material, to the aqueous raffinate from the copper extraction process in order to raise the pH of the raffinate to from about 3 to about 5.5, (g) adding zinc powder to the solution thus obtained in order to reduce the content of metallic impurities in the solution, (h) recovering zinc from the solution thus obtained by contacting it, in a liquid-liquid extraction process, with a solution of a dialkyl phosphoric acid in an organic solvent, (i) returning the aqueous raffinate leaving the extraction process to renewed leaching, (j) re-extracting zinc from the organic solution by contacting it, in a liquid-liquid extraction process, with an aqueous solution containing from about 40 to about 600 grams per liter of sulphuric acid in such quantity that the sulphuric acid solution leaving the re-extraction process contains from about 60 to about 150 grams per liter of zinc, (k) returning the organic solution leaving the re-extraction process to renewed extraction, and (l) recovering zinc from the zinc-containing sulphuric acid solution.

7. The method of claim 6, wherein the copper extractant is a mixture comprising beta-hydroxy benzophenone and an alpha-hydroxy oxime.

* * * * *

UNITED STATES PATENT AND TRADEMARK OFFICE
CERTIFICATE OF CORRECTION

PATENT NO. : 4,124,462
DATED : November 7, 1978
INVENTOR(S) : Hans Reinhardt, Harald D. Ottertun and Sven O.S. Andersson It is certified that error appears in the above–identified patent and that said Letters Patent are hereby corrected as shown below:

Under the heading "Foreign Application Priority Data" please correct the filing date of Swedish Application No. 7610685 from "September 26, 1976" to --September 27, 1976--.

Signed and Sealed this

Seventeenth Day of April 1979

[SEAL]

Attest:

RUTH C. MASON
Attesting Officer

DONALD W. BANNER
Commissioner of Patents and Trademarks